US012719530B2

(12) United States Patent
Yao et al.

(10) Patent No.: US 12,719,530 B2
(45) Date of Patent: Aug. 25, 2026

(54) METHOD FOR IDENTIFYING INTELLIGENT SURFACE DEVICE, COMMUNICATION DEVICE, AND INTELLIGENT SURFACE DEVICE

(71) Applicant: VIVO MOBILE COMMUNICATION CO., LTD., Guangdong (CN)

(72) Inventors: Jian Yao, Guangdong (CN); Dajie Jiang, Guangdong (CN); Pu Yuan, Guangdong (CN); Kun Yang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 316 days.

(21) Appl. No.: 18/513,842

(22) Filed: Nov. 20, 2023

(65) Prior Publication Data

US 2024/0088947 A1 Mar. 14, 2024

Related U.S. Application Data

(63) Continuation of application No. PCT/CN2022/093074, filed on May 16, 2022.

(30) Foreign Application Priority Data

May 21, 2021 (CN) ......................... 202110558922.4

(51) Int. Cl.
*H04B 7/04* (2017.01)
*H04B 7/155* (2006.01)

(52) U.S. Cl.
CPC ......... *H04B 7/04013* (2023.05); *H04B 7/155* (2013.01)

(58) Field of Classification Search
None
See application file for complete search history.

(56) References Cited

U.S. PATENT DOCUMENTS

2019/0317191 A1 10/2019 Santra et al.
2021/0013619 A1 1/2021 Alkhateeb et al.
(Continued)

FOREIGN PATENT DOCUMENTS

CN 109830097 A 5/2019
CN 111093267 A 5/2020
(Continued)

OTHER PUBLICATIONS

Aubry et al, "Reconfigurable Intelligent Surfaces for N-LOS Radar Surveillance", arxiv.org, Cornell University Library, 201 Olin Library Cornell University Ithaca, NY 14853, May 3, 2021, XP081954908.
(Continued)

*Primary Examiner* — Yaotang Wang
(74) *Attorney, Agent, or Firm* — Foley & Lardner LLP

(57) ABSTRACT

This application discloses a method for identifying an intelligent surface device, a communication device, and an intelligent surface device, which relate to the field of wireless communication technologies. The method for identifying an intelligent surface device in embodiments of this application includes: sending, by a first communication device, a first signal; and obtaining, by the first communication device, identification information related to an intelligent surface device, where the identification information is information obtained by detecting an echo signal of the first signal by the first communication device, or information that is obtained by detecting an echo signal of the first signal by a second communication device and then is forwarded to the first communication device.

17 Claims, 7 Drawing Sheets

200

S210

A first communication device sends a first signal

S212

The first communication device obtains identification information related to an intelligent surface device

(56) References Cited

U.S. PATENT DOCUMENTS

2021/0126359 A1 4/2021 Kim et al.
2022/0232422 A1 * 7/2022 Dai ........................ H04W 72/21
2023/0041198 A1 2/2023 Chen et al.
2023/0266458 A1 * 8/2023 Liu ........................ G01S 5/0273
342/125
2024/0204398 A1 * 6/2024 Zhu .......................... H01Q 3/22

FOREIGN PATENT DOCUMENTS

CN 111245492 A 6/2020
CN 111901014 A 11/2020
JP 2013527677 A 6/2013
WO 2019153016 A1 8/2019
WO 2021109345 A1 6/2021

OTHER PUBLICATIONS

Salah Eddine Zegrar, Vestel et al: "EHT via Reconfigurable Surfaces", IEEE Draft; 11-20-1720-01-0WNG-EHT-VIA-Reconfigurable Surfaces, IEEE-SA Mentor, Piscataway, NJ USA, vol. 802.11 WNG, No. 1, Nov. 2, 2020.
Huawei, Hisilicon, "Considerations on other enhancements for positioning accuracy", 3GPP TSG RAN WG1 Meeting #104-e, R1-2101252, Jan. 25-Feb. 5, 2021, E-meeting.

* cited by examiner

METHOD FOR IDENTIFYING INTELLIGENT SURFACE DEVICE, COMMUNICATION DEVICE, AND INTELLIGENT SURFACE DEVICE

CROSS-REFERENCE TO RELATED APPLICATIONS

The present invention is a Bypass Continuation Application of PCT International Application No. PCT/CN2022/093074 filed on May 16, 2022, which claims priority to Chinese Patent Application No. 202110558922.4, filed with the China National Intellectual Property Administration on May 21, 2021 and entitled "METHOD FOR IDENTIFYING INTELLIGENT SURFACE DEVICE, COMMUNICATION DEVICE, AND INTELLIGENT SURFACE DEVICE", which are incorporated herein by reference in their entireties.

TECHNICAL FIELD

This application relates to the field of wireless communication technologies, and specifically, to a method for identifying an intelligent surface device, a communication device, and an intelligent surface device.

BACKGROUND

In a wireless environment, an intelligent surface device is usually used as an auxiliary relay in a mobile communication system, to construct a controllable propagation channel, improve a wireless communication environment, and enhance signal quality at a receiving end.

Currently, during use of the intelligent surface device, a position of the intelligent surface device relative to a base station is known, and a channel between the intelligent surface device and the base station is a static or semi-static channel. However, in a case that the base station or a terminal does not know existence of the intelligent surface device, or the position of the intelligent surface device is unknown, currently, there is no exact solution for the base station or the terminal to identify the intelligent surface device.

SUMMARY

According to a first aspect, a method for identifying an intelligent surface device is provided, including: sending, by a first communication device, a first signal; and obtaining, by the first communication device, identification information related to an intelligent surface device, where the identification information is information obtained by detecting an echo signal of the first signal by the first communication device, or information that is obtained by detecting an echo signal of the first signal by a second communication device and then is forwarded to the first communication device.

According to a second aspect, an apparatus for identifying an intelligent surface device is provided. The apparatus is used in a first communication device and includes: a sending module, configured to send a first signal; and an obtaining module, configured to obtain identification information related to an intelligent surface device, where the identification information is information obtained by detecting an echo signal of the first signal by the first communication device, or information that is obtained by detecting an echo signal of the first signal by a second communication device and then is forwarded to the first communication device.

According to a third aspect, a signal reflection method is provided, including: receiving, by an intelligent surface device, a first signal sent by a first communication device; and reflecting, by the intelligent surface device, the first signal in a specific reflection mode, to send an echo signal of the first signal.

According to a fourth aspect, a signal reflection apparatus provided. The apparatus is used in an intelligent surface device and includes: a receiving module, configured to receive a first signal sent by a first communication device; and a reflection module, configured to reflect the first signal in a specific reflection mode, to send an echo signal of the first signal.

According to a fifth aspect, a communication device is provided. The communication device includes a processor, a memory, and a program or instructions stored in the memory and executable on the processor, the program or instructions, when executed by the processor, implementing the steps of the method according to the first aspect.

According to a sixth aspect, a communication device is provided, including a processor and a communication interface. The processor is configured to implement the steps of the method according to the first aspect, and the communication interface is configured to communicate with an external communication device.

According to a seventh aspect, an intelligent surface device is provided. The intelligent surface device includes a processor, a memory, and a program or instructions stored in the memory and executable on the processor, the program or instructions, when executed by the processor, implementing the steps of the method according to the third aspect.

According to an eighth aspect, an intelligent surface device is provided, including a processor and a communication interface. The processor is configured to implement the steps of the method according to the third aspect, and the communication interface is configured to communicate with an external communication device.

According to a ninth aspect, a readable storage medium is provided, the readable storage medium storing a program or instructions, the program or instructions, when executed by the processor, implementing the steps of the method according to the first aspect or the steps of the method according to the third aspect.

According to a tenth aspect, a chip is provided. The chip includes a processor and a communication interface, where the communication interface is coupled to the processor, and the processor is configured to run a program or instructions to implement the steps of the method according to the first aspect, or implement the steps of the method according to the third aspect.

According to an eleventh aspect, a computer program/program product is provided. The computer program/program product is stored in a non-transitory storage medium, and the computer program/program product is executed by at least one processor to implement the steps of the method according to the first aspect, or implement the steps of the method according to the third aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

In the specification and the claims of this application, the terms "first", "second", and so on are intended to distinguish similar objects but do not necessarily indicate a specific order or sequence. It is to be understood that the term used in such a way is interchangeable in proper circumstances, so that the embodiments of this application can be implemented in other sequences than the sequence illustrated or described herein. In addition, the objects distinguished by "first", "second", and the like are usually of one type, and a quantity of objects is not limited, for example, there may be one or more first objects. In addition, "and/or" used in the specification and the claims represents at least one of the connected objects, and a character "I" in this specification generally indicates an "or" relationship between the associated objects.

It is to be noted that, the technologies described in the embodiments of this application are not limited to a long term evolution (LTE)/LTE-Advanced (LTE-A) system, or may be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. In the embodiments of this application, the terms "system" and "network" are usually interchangeably used, and the technology described herein can be applied to the systems and radio technologies mentioned above, and can also be applied to other systems and radio technologies. Although the technologies are also applicable to applications other than NR system applications, for example, a 6th generation (6G) communication system, a new radio (NR) system is exemplarily described in the following descriptions, and the term "NR" is used in most of the following descriptions.

Figure 1:
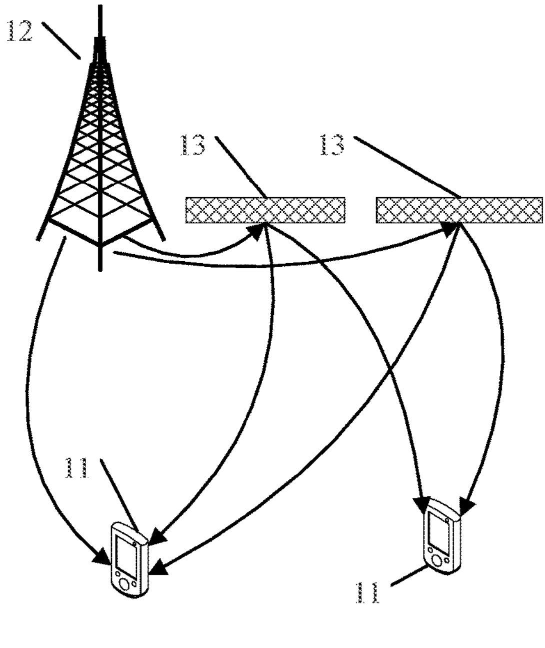
FIG. 1 is a schematic diagram of a wireless communication to which an embodiment of this application is applicable.

FIG. 1 is a schematic diagram of a wireless communication to which an embodiment of this application is applicable. The wireless communication system includes a terminal 11, a wireless auxiliary device 13, and a network side device 12. However, the terminal 11 may also be referred to as a terminal device or a user equipment (UE). The terminal 11 may be a terminal side device such as a mobile phone, a tablet computer, a laptop computer or notebook computer, a Personal Digital Assistant (PDA), a palmtop computer, a notebook, an ultra-mobile personal computer (UMPC), a Mobile Internet Device (MID), a wearable device, a vehicle user equipment (VUE), a pedestrian user equipment (PUE), or the like. The wearable device includes a bracelet, a headset, glasses, and the like. It is to be noted that, a specific type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a nodeB, an evolved nodeB (eNB), a home node B, a home evolved node B, a WLAN access point, a Wi-Fi node, a transmitting receiving point (TRP), or another suitable term in the field. The base station is not limited to a specific technical term as long as the same technical effect is achieved. An intelligent surface device 13 may be a large intelligent surface (ILIS) device, a reconfigurable intelligent surface (RIS), a passive intelligent surface device or an active intelligent surface device, an active and passive intelligent surface device, a relay device of a layer 1 (L1), or a repeator or a backscatter of the L1. The large intelligent surface device may also be referred to as an intelligent reflected surface, an intelligent metasurface, a programmable/reconfigurable metasurface, or the like. The intelligent surface device may have a beamforming function, or may not have a beamforming function.

In this embodiment of this application, the terminal 11 or the base station 12 may have a communication-sensing integrated function. Communication-sensing integration means that in a same system, spectrum sharing and hardware sharing are performed to implement a design that integrates communication and sensing functions. The system can sense information such as an orientation, a distance, and a speed while performing information transfer, to detect, track, and identify a target device or event, so that a communication system and a sensing system are cooperated to improve overall performance and bring better service experience.

Communication-radar integration belongs to a typical communication-sensing integrated application. In the past, a radar system and the communication system are strictly distinguished due to different research objects and focuses. In most scenarios, the two systems are distributed for research. In fact, both the radar system and the communication system are used as typical manners for sending, obtaining, processing, and exchanging information, and there are many similarities in terms of an operating principle, a system architecture, and a frequency band. A design of communication-radar integration has relatively large feasibility, which is mainly reflected in the following aspects. First, both the communication system and the sensing system complete acquisition and transmission of information by using emission and reception of electromagnetic waves based on an electromagnetic wave theory. Secondly, both the communication system and the sensing system have structures such as an antenna, a sending end, a receiving end, and a signal processor, and greatly overlap on hardware resources. With the development of the technologies, the communication system and the sensing system have more overlap on operating frequency bands. In addition, both the communication system and the sensing system have similarities in key technologies such as signal modulation, reception detection, and waveform design. Integration of the communication system and the radar system can bring many advantages, such as reducing costs, reducing size, reducing power consumption, improving spectral efficiency, and reducing mutual interference, thereby improving the overall system performance.

Because both the radar system and the communication system are used as typical manners for sending, obtaining, processing, and exchanging information, there are many similarities in terms of an operating principle, a system architecture, and a frequency band. Therefore, integration of communication and radar may be designed. In the related art, the integrated design of the radar system and the communication system includes: spectrum coexistence, that is, the two systems work independently, and information exchange may be allowed to reduce mutual interference; receiving end sharing, where in this case, sending ends of the two systems send respective signal waveforms, and waveforms of the two systems need to be orthogonal, so that respective reception and detection are not affected; sending end sharing, that is, the sending end transmits a joint waveform of radar and communication; and sending and receiving end sharing, that is, resource sharing is performed on sending and receiving sides of the two systems, which also requires the joint waveform or waveforms with an orthogonal relationship.

A radar sensing function is introduced into a mobile communication system. During sensing, sensing may be performed based on a single station mode, that is, sending and receiving are co-located, where the sending end transmits a sensing signal, and then receives and analyzes an echo signals by itself to extract sensing parameters, for example, a base station is used as a sending end and a receiving end of the sensing signal, and a terminal or another object is used as a sensing target; or sensing may be performed based on a dual-station/multi-station mode, that is, sending and receiving are not co-located, where the sending end transmits a sensing signal, and another receiving end performs reception and analysis to extract sensing parameters, for example, a base station A is used as a sending end of the sensing signal, and a terminal or a base station B is used as a receiving end of the sensing signal.

It is to be noted that, in the embodiments of this application, a base station in the NR system is only used as an example, but a specific type of the base station is not limited.

The solutions for identifying an intelligent surface device provided in the embodiments of this application are described in detail below with reference to the accompanying drawings by using some embodiments and application scenarios thereof.

Figure 2:
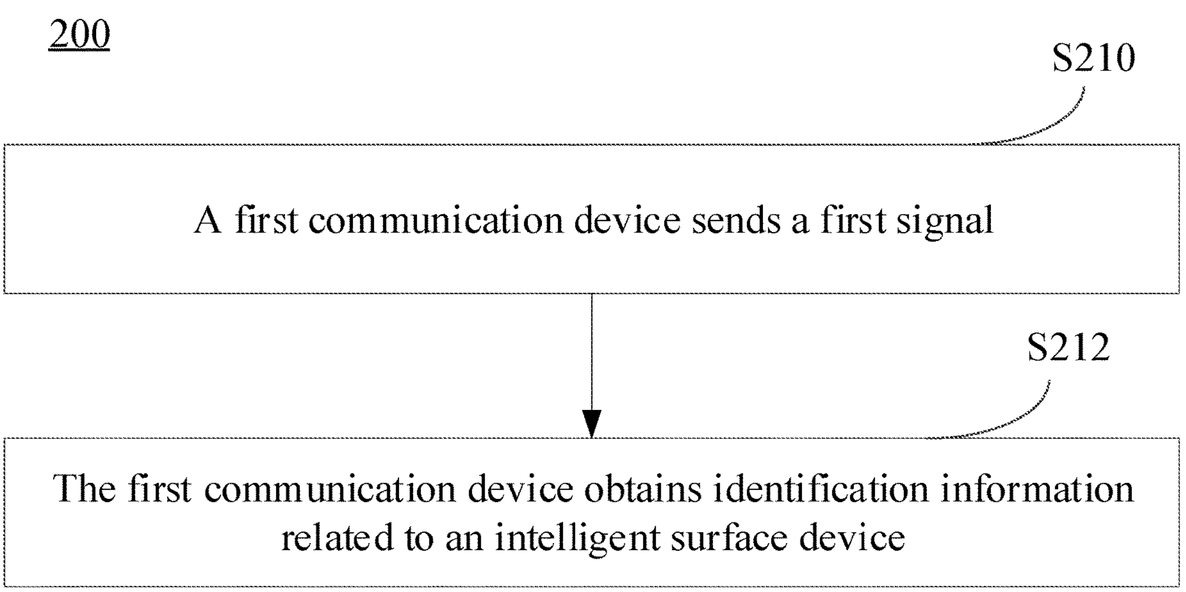
FIG. 2 is a flowchart of a method for identifying an intelligent surface device according to an embodiment of this application.

FIG. 2 is a schematic flowchart of a method for identifying an intelligent surface device according to an embodiment of this application. The method 200 may be performed by a first communication device. In other words, the method may be performed by software or hardware installed on the first communication device. As shown in FIG. 2, the method may include the following steps.

S210: A first communication device sends a first signal.

In this embodiment of this application, the first communication device may be a base station, or may be a terminal. The first communication device may have a radar sensing function.

In this embodiment of this application, the first signal may be a detection signal. For example, the first communication device may send a detection signal to a surrounding environment when needing to know whether there is an intelligent surface device in the surrounding environment.

In this embodiment of this application, the first signal may include one of (1) to (3).

(1) A sensing signal for implementing a sensing function. For example, the first signal is a signal for sensing a target object, an event, or an environment, for example, a radar signal, such as a pulse signal or a frequency-modulated continuous wave signal.

(2) A communication signal for information transmission. In other words, the first signal is a signal only for information transfer between sending and receiving, for example, a synchronization signal/physical broadcast channel block (or a synchronization signal and PBCH block) (synchronization signal and PBCH block, SSB).

(3) A communication-sensing integrated signal for implementing the sensing function and information transmission. In other words, the first signal may be a signal used for communication or implementing the sensing function.

In this embodiment of this application, the first communication device may send the first signal in a beam scanning manner, or may send in a manner of simultaneously sending a plurality of beams, or may send in an omnidirectional sending manner. For example, the first communication device may send the first signal in the beam scanning manner according to a beam angle set $\{\alpha 1, \alpha 2, \alpha 3, \ldots, \alpha n\}$, that is, beams are sent in different directions at different moments.

S212: The first communication device obtains identification information related to an intelligent surface device, where the identification information is information obtained by detecting an echo signal of the first signal by the first communication device, or information that is obtained by detecting an echo signal of the first signal by a second communication device and then is forwarded to the first communication device.

In this embodiment of this application, after receiving the first signal, the intelligent surface device reflects the first signal, that is, sends the echo signal of the first signal. In this way, a feature that the intelligent surface device can increase or control an echo is used, the echo signal sent by the intelligent surface device is listened, and an intelligent surface device in a current communication environment of the first communication device can be identified.

In a possible implementation of this embodiment of this application, to enable the intelligent surface device to return the first signal, a control command may be included in the first signal, where the control command is used for controlling a reflection mode for the intelligent surface device to reflect the first signal. In other words, the reflection mode for the intelligent surface device to reflect the first signal is controlled by using the control command. For example, an angle at which the intelligent surface device reflects the first signal may be controlled. Optionally, the control command may be associated with at least one angle in a beam forwarding angle set preset by the intelligent surface device. In this possible implementation, a control command that is in a first signal each time sent by the first communication device and that is for a signal reflection mode (which is also referred to as a forwarding mode) of the intelligent surface device is associated with at least one angle in the beam forwarding angle set preset by the intelligent surface device.

For example, when the first signal is the communication signal for information transmission or the communication-sensing integrated signal for implementing the sensing function and information transmission, the first signal may include the control command.

In another possible implementation, the first communication device may send a first trigger signal, where the first trigger signal is used for triggering the intelligent surface device to use a specific reflection mode. In this possible implementation, the first trigger signal may be used to trigger the intelligent surface device to use the specific reflection mode, so that the intelligent surface device may reflect the first signal in an agreed manner.

In a specific application, the first communication device may transmit the first trigger signal in an omnidirectional sending manner, or in a beam scanning manner according to a beam angle set $\{\alpha 1, \alpha 2, \alpha 3, \ldots, \alpha n\}$, that is, beams are sent in different directions at different moments, or in a multi-beam sending manner.

Optionally, the first trigger signal is included in the first signal. For example, when the first signal is the communication signal for information transmission or the communication-sensing integrated signal for implementing the sensing function and information transmission, the first signal may include the first trigger signal. For example, the first communication device may carry the first trigger signal in the first signal when transmitting the first signal for the first time or transmitting the first signal several times before.

Optionally, the first communication device may send the first trigger signal in a broadcast manner, to trigger the specific reflection mode of the intelligent surface device.

In a possible implementation, to ensure security, the first communication device may further include identity indication information in the first signal, where the identity indication information is used for indicating an identity of the first communication device. The intelligent surface device may determine, according to the identity indication information, whether the first communication device is a valid device, that is, whether the first signal is a valid detection signal. For example, effective signal reflection is not performed when the communication signal for information transmission or the communication-sensing integrated signal for implementing the sensing function and information transmission includes valid indication information such as specific identity information of the base station or the terminal, and the intelligent surface device does not identify the valid indication information. For example, a detection signal sent by the base station or the terminal includes a signal format agreed in advance, the intelligent surface device may listen to and detect a received signal to determine whether the signal is a valid detection signal including the valid indication information of the base station or the terminal. In another example, a communication signal or a communication-sensing integrated signal sent by the base station or the terminal includes a training sequence associated with the identity information of the base station or the terminal, and the intelligent surface device matches filtering to detect whether a peak value is greater than a threshold, to determine whether the signal is a valid detection signal.

In another possible implementation, a default reflection mode of the intelligent surface device may be the specific reflection mode. In this possible implementation, to enable the intelligent surface device to normally perform a forwarding operation after identification, after S212, the method may further include: sending, by the first communication device, first indication information to the intelligent surface device, where the first indication information instructs the intelligent surface device to exit a specific reflection mode, and the specific reflection mode is a default reflection mode of the intelligent surface device. In other words, in this possible implementation, a default configuration and/or pre-configuration of the intelligent surface device is the specific reflection mode, that is, when there is no signal forwarding behavior (that is, there is no associated service base station or terminal), the intelligent surface device forwards a signal according to the default configuration, and instructs, after the base station or the terminal completes identification, the base station or the terminal to stop use configuration of a default forwarding mode.

In a possible implementation, the specific reflection mode may include one of (1) and (2).

(1) First reflection mode. In the first reflection mode, the intelligent surface device reflects a received signal at an angle in a preset beam forwarding angle set. In this possible implementation, a variation range from a minimum angle to a maximum angle in the beam forwarding angle set includes a reflection angle corresponding to an incident angle, that is, an azimuth angle at which a transmitter is located, or an azimuth angle at which a potential receiver is located. In other words, the intelligent surface device performs reflection according to a preset beam forwarding angle set $\{\theta 1, \theta 2, \theta 3, \ldots, \theta n\}$. Assuming that $\theta 1<\theta 2<\theta 3< \ldots <\theta n$, an incident angle $\alpha$ corresponding to the incident angle and an angle in the set meet a relationship $\theta 1 \leq \alpha \leq \theta n$.

Figure 3:
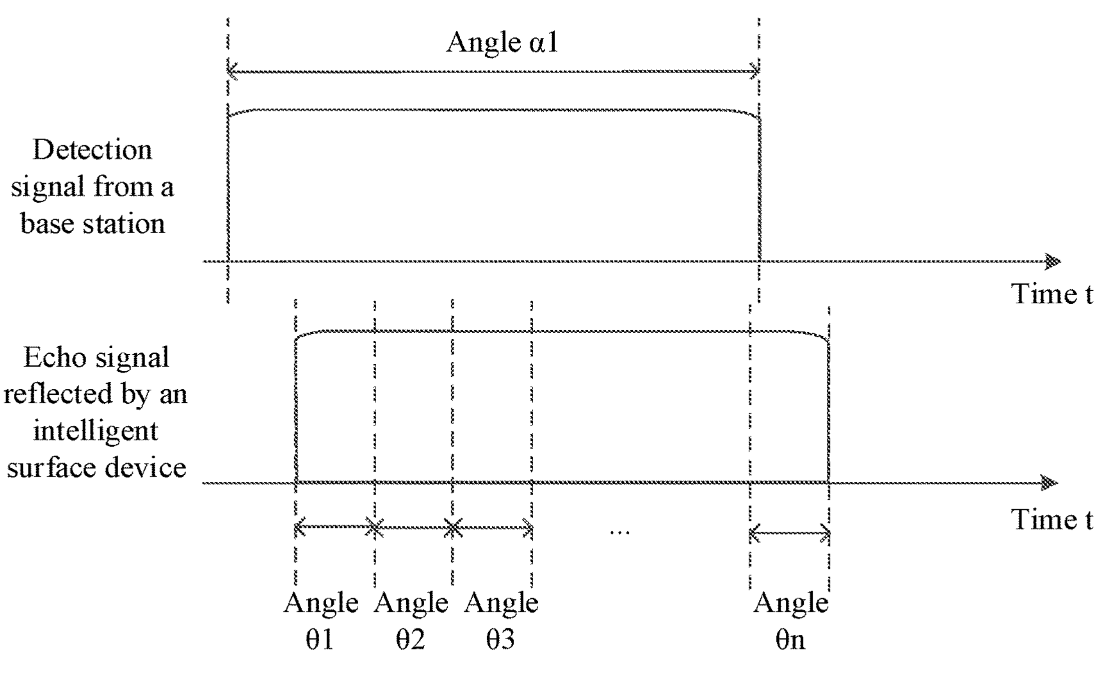
FIG. 3 is a schematic diagram of a detection signal and an echo signal according to an embodiment of this application.

In the first reflection mode, one first signal may correspond to each angle in the beam forwarding angle set, that is, for one first signal, the intelligent surface device performs traversal reflection on angles in the beam forwarding angle set. In this case, a first duration for the first communication device to send a single first signal is at least greater than a total mode switching time required by the intelligent surface device for traversing angles in the beam forwarding angle set. In this possible implementation, after receiving the first signal (for example, a detection pulse signal), the intelligent surface device performs traversal reflection at an angle in the angle set within a duration of the single first signal, as shown in FIG. 3.

Figure 4:
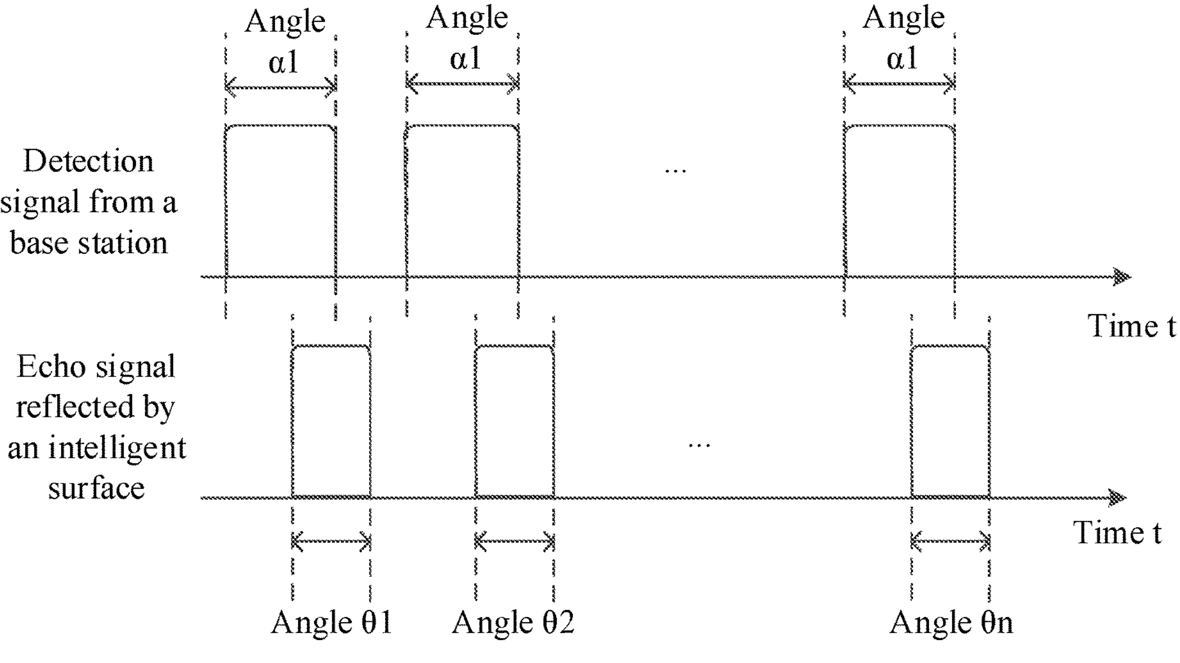
FIG. 4 is another schematic diagram of a detection signal and an echo signal according to an embodiment of this application.

Alternatively, in the first reflection mode, one first signal corresponds to one angle in the beam forwarding angle set, that is, for one first signal, the intelligent surface device performs reflection at an angle in the beam forwarding angle set. In this case, a quantity of first signals sent by the first communication device at a same angle and/or in a same beam direction is at least greater than a quantity of angles in the beam forwarding angle set. In this possible implementation, as shown in FIG. 4, the intelligent surface device performs reflection at an angle in the angle set within a duration of a single pulse signal (that is, the first signal). In this possible implementation, a quantity of transmitted pulses of the first communication device in each direction is at least greater than a quantity of elements in an intelligent surface preset angle set. Optionally, reflection may also be performed at an angle in the angle set within a duration of a plurality of pulse signals (that is, first signals), that is, one reflection angle corresponds to the plurality of pulse signals, so that the first communication device performs echo pulse accumulated detection, thereby improving detection performance. In this case, the quantity of transmitted pulses of the first communication device in each direction is at least greater than or equal to a product of the quantity of elements in the intelligent surface preset angle set and a quantity of pulse signals corresponding to each angle.

Based on the above, to ensure that the first communication device can listen to an echo signal corresponding to each first signal, a start moment of a latter first signal that is sent by the first communication device at the same angle and/or in the same beam direction is later than an end moment of echo listening of a former first signal.

(2) Second reflection mode. In the second reflection mode, the intelligent surface device reflects a received signal at an angle corresponding to a direction of arrival. In other words, in this possible implementation, the intelligent surface device may form forwarding beams according to the direction of arrival, to reflect all signals. In this possible implementation, the intelligent surface device may include an active unit, and AoA estimation may be performed by using the active unit, to obtain a direction of arrival of the first signal.

In a possible implementation, after sending a first signal, the first communication device may listen to an echo signal of the first signal, where a second duration for listening may be based on a maximum detection distance of the first communication device and/or a first duration for sending a single first signal. For example, in the reflection mode shown in FIG. 4, the first communication device may determine the second duration for listening according to a maximum detection distance Dmax; and in the reflection mode shown in FIG. 3, the first communication device may determine the second duration for listening according to the first duration for sending the first signal. Alternatively, the first communication device may determine the second duration according to the maximum detection distance and the first duration. For example, a second duration T1, the maximum detection distance Dmax, and a first duration T for sending the first signal meet the following relationship:

$T1 \geq 2Dmax/c+T$, where c represents the speed of light.

In a possible implementation, after listening to the echo signal of the first signal, the first communication device may determine, according to strength of the listened echo signal, whether there is an intelligent surface device at a transmission angle and/or in a beam direction of the first signal. For example, whether there is an intelligent surface device in a current beam direction is determined based on a relationship between a received signal strength indication (RSSI) or a correlation peak value after correlating echoes and a threshold. If the RSSI or the correlation peak value is greater than the threshold, it indicates that there is an intelligent surface device in a transmission direction and/or the beam direction of the first signal; or otherwise, it indicates that there is no intelligent surface device in a transmission direction and/or the beam direction of the first signal.

Figure 5:
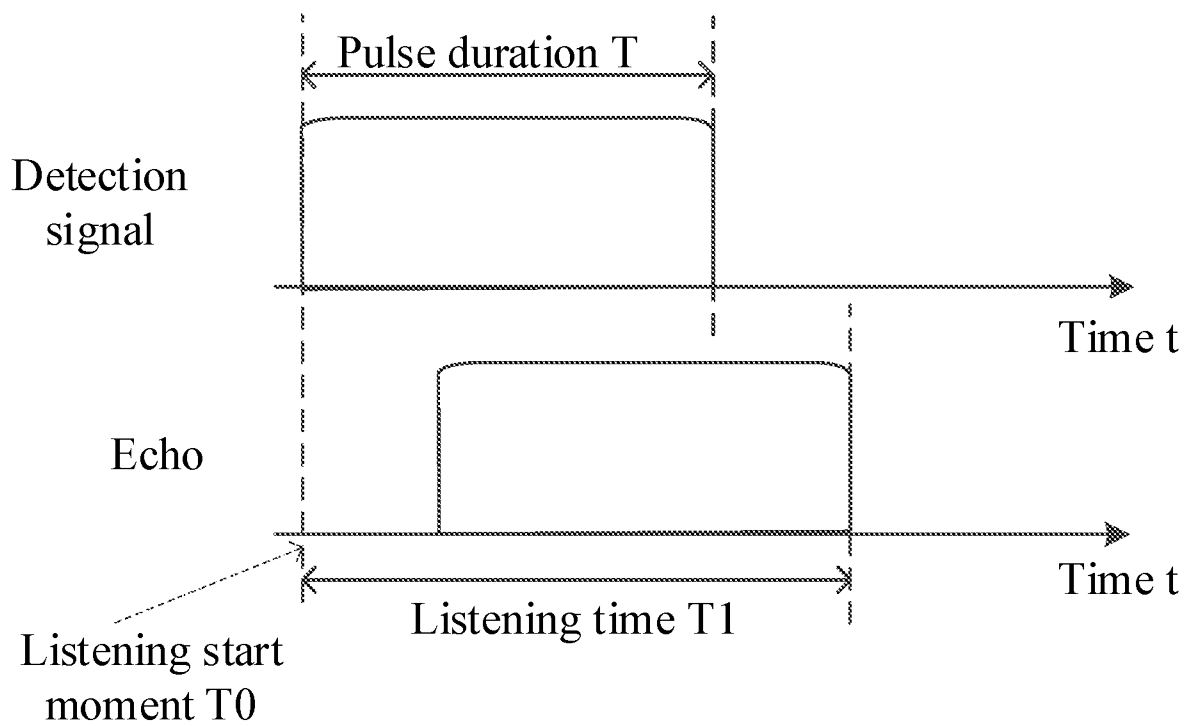
FIG. 5 is a schematic diagram of a listening time of an echo signal according to an embodiment of this application.

For example, if the first communication device is in a full-duplex mode, a listening start moment may at least start from sending of a detection signal. As shown in FIG. 5, the first communication device starts to listen to the echo signal at a start moment of a pulse detection signal transmitted in a specific direction α1. Certainly, this application is not limited thereto, the first communication device may determine, according to the maximum detection distance Dmax of the first communication device, a latest moment at which the first communication device starts to receive the echo signal. Therefore, it is also feasible to start listening as long as listening is before this moment. This is not specifically limited in the embodiments of this application.

Figure 6:
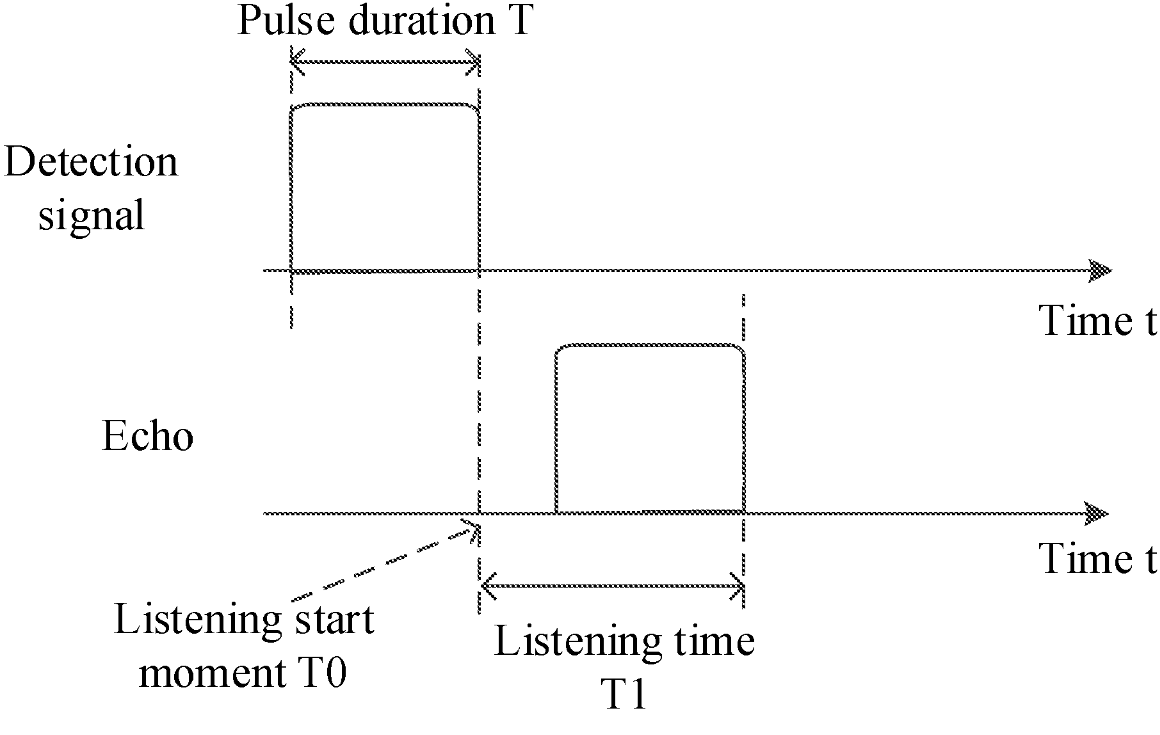
FIG. 6 is another schematic diagram of a listening time of an echo signal according to an embodiment of this application.

If the first communication device is in a half-duplex mode, as shown in FIG. 6, a listening start moment may at least start from completion of the sending of the detection signal. Certainly, this application is not limited thereto, the first communication device may determine, according to the maximum detection distance Dmax of the first communication device, a latest moment at which the first communication device starts to receive the echo signal. Therefore, it is also feasible to start listening as long as listening is before this moment. This is not specifically limited in the embodiments of this application.

In a possible implementation of this embodiment of this application, when reflecting the first signal, the intelligent surface device may further change feature information of the first signal according to a first rule, to indicate identity information of the intelligent surface device in the echo signal. Therefore, in this possible implementation, that the first communication device obtains identification information may further include: detecting, by the first communication device, feature information of the echo signal, and identifying identity information of the intelligent surface device according to a detection result, where the feature information includes at least one of the following: an amplitude, a phase, polarization, and orbital angular momentum information. Further, the first communication device may further analyze the echo signal to obtain a distance, a movement speed, an angle, and other information corresponding to the intelligent surface device.

In a possible implementation, the first communication device may further collaborate with the second communication device to implement identification on the intelligent surface device. In this possible implementation, that the first communication device obtains identification information includes: sending, by the first communication device, second indication information to the second communication device, where the second indication information includes at least one of the following: an indication of starting echo listening and a format of the first signal; and receiving, by the first communication device, the identification information sent by the second communication device, where the identification information is obtained by detecting and analyzing the echo signal of the first signal by the second communication device, and the identification information includes third indication information, the third indication information being used for indicating whether there is an intelligent surface device at a transmission angle and/or in a beam direction of the first signal.

In a specific application, after receiving the second indication information sent by the first communication device, the second communication device may detect and analyze the echo signal of the first signal in a manner the same as that of the first communication device, to obtain the identification information. Details are not described in this embodiment of this application.

Optionally, the identification information returned by the second communication device may also include identity information of the intelligent surface device.

In a possible implementation, the second communication device may also return only related information of the listened echo signal of the first signal to the first communication device, and the first communication device perform analysis according to the related information of the echo signal, to obtain the identification information.

In this possible implementation, after listening to an echo signal of one first signal, the second communication device may return identification information corresponding to the echo signal to the first communication device once. Alternatively, the first communication device may indicate the format of the first signal in the second indication information, where the format of the first signal includes at least one of the following: a waveform, sequence information, a sending angle, and a beam direction of the first signal. Optionally, the identification information returned by the second communication device may further include a target sending angle and/or a target beam direction, where the target sending angle and/or the target beam direction are/is a sending angle and/or a beam direction of the first signal corresponding to the echo signal. In this case, after listening to and analyzing echo signals of a plurality of first signals, the second communication device may return identification information corresponding to the plurality of first signals to the first communication device in a unified manner.

In this embodiment of this application, the second communication device may be a base station, or may be a terminal, which is not specifically limited in this embodiment of this application.

For example, a base station A sends indication information to a base station B, where the indication information may include an instruction to start echo listening start, a format of the sent detection signal, and the like. The base station B receives the indication information from the base station A, and starts listening. The base station A sends a first trigger signal to a surrounding environment (optionally). The base station A sends a detection signal to the surrounding environment. The intelligent surface device reflects the detection signal in a specific reflection mode. The base station B receives and analyzes an echo feature, determines whether there is an intelligent surface device in a transmission direction in which the base station A sends the detection signal and/or a beam sending direction, and may further obtain the identity information of the intelligent surface device. The base station B feeds back information to the base station A, at least including indication information of whether there is an intelligent surface device in the transmission direction in which the base station A sends the detection signal and/or the beam sending direction, and further including identity indication information of the intelligent surface device, and the like.

In another example, a base station sends indication information to a terminal, where the indication information may include an instruction to start echo listening start, a format of the sent detection signal, and the like. The terminal receives the indication information from the base station, and starts listening. The base station sends a first trigger signal to a surrounding environment (which is an optional step). The base station sends a detection signal to the surrounding environment. The intelligent surface device reflects the detection signal in a specific reflection mode. The terminal receives and analyzes an echo feature, determines whether there is an intelligent surface device in a transmission direction in which the base station sends the detection signal and/or a beam sending direction, and may further obtain the identity information of the intelligent surface device. The terminal feeds back information to the base station, at least including indication information of whether there is an intelligent surface device in the transmission direction in which the base station sends the detection signal and/or the beam sending direction, and further including identity indication information of the intelligent surface device, and the like.

According to the technical solutions provided in the embodiments of this application, when the base station or the terminal has a radar sensing function, an intelligent surface device in the surrounding environment may be detected and identified by using an echo signal.

Figure 7:
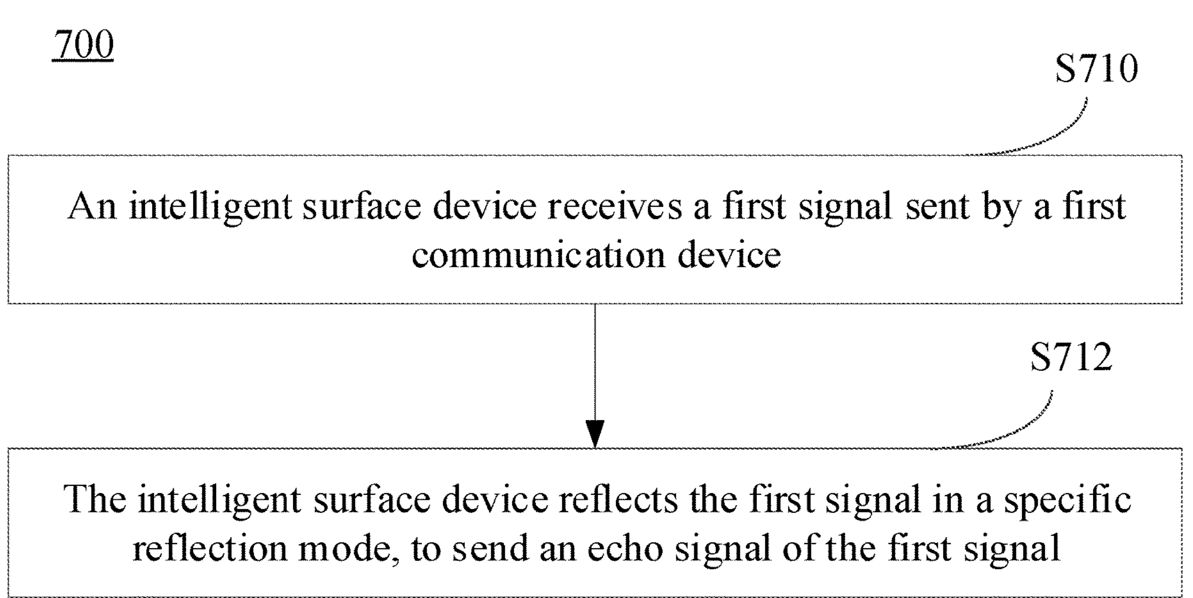
FIG. 7 is a flowchart of a signal reflection method according to an embodiment of this application.

FIG. 7 is a schematic flowchart of a signal reflection method according to an embodiment of this application. The method 700 may be performed by an intelligent surface device. In other words, the method may be performed by software or hardware installed on the intelligent surface device. As shown in FIG. 7, the method may include the following steps.

S710: An intelligent surface device receives a first signal sent by a first communication device.

The first signal may be the same as the first signal in the method 200. For details, refer to related descriptions in the method 200. Details are not described herein again.

In this embodiment of this application, the first communication device may send the first signal in the manner in the method 200. For details, refer to related descriptions in the method 200. Details are not described herein again.

S712: The intelligent surface device reflects the first signal in a specific reflection mode, to send an echo signal of the first signal.

In a possible implementation, before S712, the method may further include: receiving, by the intelligent surface device, a first trigger signal sent by the first communication device, and setting a reflection mode of the intelligent surface device to the specific reflection mode.

Optionally, the first trigger signal is included in the first signal.

In another possible implementation, before S712, the method may further include: entering, by the intelligent surface device, the specific reflection mode when there is no signal forwarding behavior, where the specific reflection mode is a default reflection mode of the intelligent surface device. In other words, in this possible implementation, the intelligent surface device operates in the specific reflection mode.

Optionally, In the possible implementation, after the intelligent surface device reflects the first signal in the specific reflection mode, the method may further include: receiving first indication information sent by the first communication device, where the first indication information instructs the intelligent surface device to exit the specific reflection mode; and stopping use of the specific reflection mode according to an indication of the first indication information.

In a possible implementation, before S712, the method may further include: determining identity indication information included in the first signal, and determining that an identity of the first communication device indicated by the identity indication information is valid. For example, the first signal transmitted by the first communication device includes a signal format agreed in advance, and the intelligent surface device determines that the first communication device is valid. In another example, the first communication device includes a training sequence associated with identity information of the first communication device in the first signal, and the intelligent surface device matches filtering to detect whether a peak value is greater than a threshold, to determine that the training sequence is included in the first signal and is consistent with a predetermined training sequence.

In a possible implementation, the specific reflection mode includes:

a first reflection mode, where in the first reflection mode, the intelligent surface device reflects a received signal at an angle in a preset beam forwarding angle set; or a second reflection mode, where in the second reflection mode, the intelligent surface device reflects a received signal at an angle corresponding to a direction of arrival.

In a possible implementation, that the intelligent surface device reflects the first signal in a specific reflection mode includes one of the following:

(1) The intelligent surface device obtains a direction of arrival of the first signal, and reflects the first signal at an angle corresponding to the direction of arrival. For example, the intelligent surface device forms forwarding beams according to the direction of arrival, to reflect all signals. In this possible implementation, the intelligent surface device includes an active unit, and AoA estimation may be performed.

(2) The intelligent surface device performs traversal reflection on one received first signal according to each angle in the beam forwarding angle set. In other words, in this possible implementation, reflecting an angle at which the first signal is reflected may be performing, after receiving the first signal, traversal reflection at an angle in the angle set within a duration of the first signal, as shown in FIG. 3.

(3) The intelligent surface device reflects at least one received first signal at an angle in the beam forwarding angle set. In other words, the intelligent surface device performs reflections according to an angle in the beam forwarding angle set within a duration of the single first signal (for example, a pulse signal), as shown in FIG. 4.

For details, refer to related descriptions in the method 200. Details are not described herein again.

In another possible implementation, the first signal may include a command for controlling the reflection mode of the intelligent surface device. In this possible implementation, that the intelligent surface device reflects the first signal in a specific reflection mode includes: reflecting, by the intelligent surface device according to a control command included in the first signal, the first signal by using a reflection mode corresponding to the control command, where an angle at which the intelligent surface device reflects the first signal is at least one angle that is in a preset beam forwarding angle set and that is associated with the control command. In other words, the intelligent surface device may reflect the first signal by using at least one angle associated with the control command. In other words, the intelligent surface device receives a control command from a signal reflection mode (that is, a forwarding mode) of the first communication device, and operates in a corresponding reflection mode, where each reflection angle is associated with a control command of a signal forwarding pattern carried in the first signal from the base station.

Figure 8:
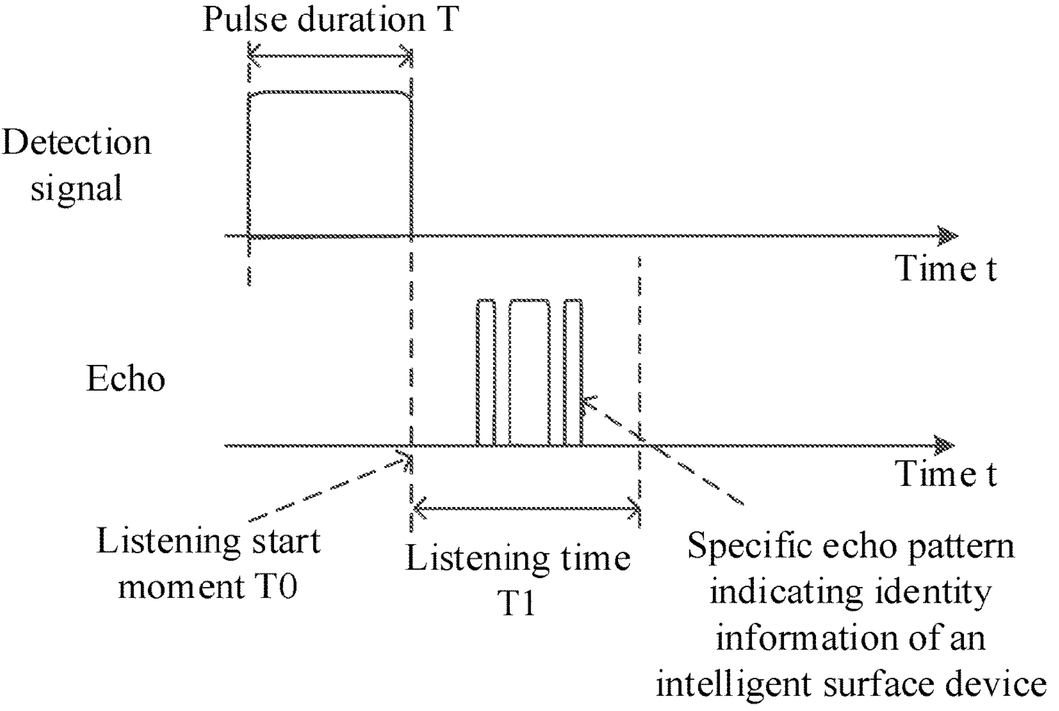
FIG. 8 is a schematic diagram of an echo signal according to an embodiment of this application.

In a possible implementation, that the intelligent surface device reflects the first signal in a specific reflection mode includes: performing, by the intelligent surface device according to a first rule, reflection by changing feature information of the first signal, where the feature information includes at least one of the following: an amplitude, a phase, polarization, and orbital angular momentum information. For example, the reflection mode of the intelligent surface device is the second reflection mode, as shown in FIG. 8, the intelligent surface device may change an amplitude of the detection signal to embed the identity information of the intelligent surface device. In FIG. 8, the first communication device operates in a half-duplex mode.

It is to be noted that, an execution entity of the method for identifying an intelligent surface device provided in the embodiments of this application may be the apparatus for identifying an intelligent surface device or may be a control module in the apparatus for identifying an intelligent surface device for performing the method for identifying an intelligent surface device. In this embodiment of this application, the apparatus for identifying an intelligent surface device provided in the embodiments of this application is described by using an example in which the apparatus for identifying an intelligent surface device performs the method for identifying an intelligent surface device.

Figure 9:
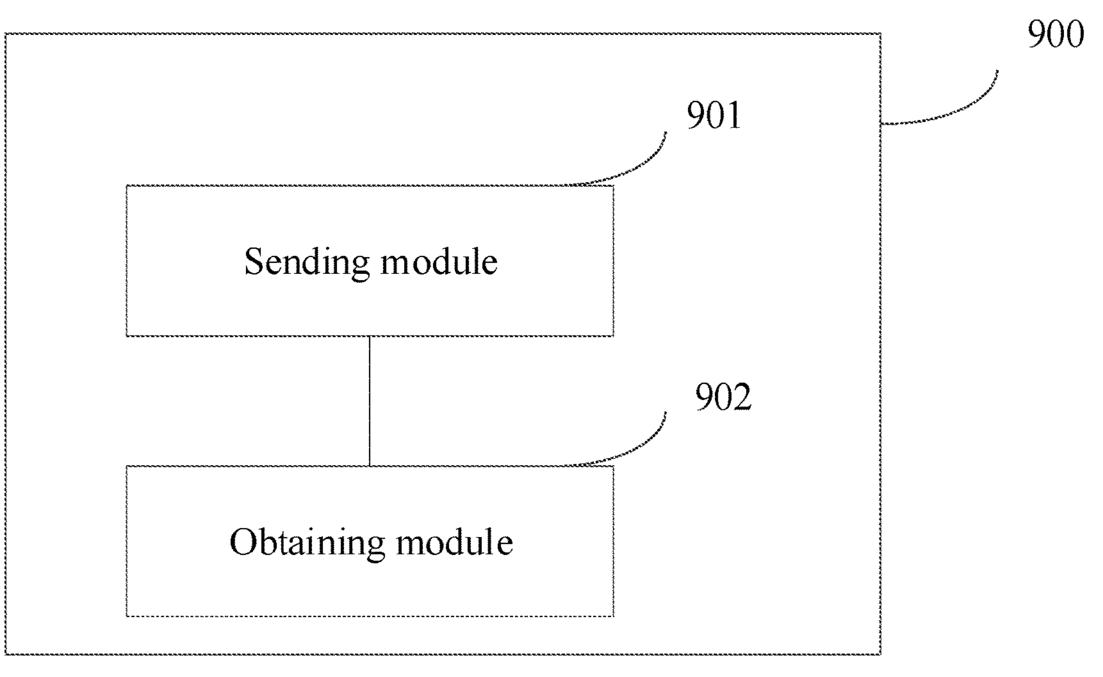
FIG. 9 is a schematic structural diagram of an apparatus for identifying an intelligent surface device according to an embodiment of this application.

FIG. 9 is a schematic structural diagram of an apparatus for identifying an intelligent surface device according to an embodiment of this application. The apparatus is applicable to a first communication device. As shown in FIG. 9, the apparatus 900 mainly includes a sending module 901 and an obtaining module 902.

In this embodiment of this application, the sending module 901 is configured to send a first signal; and the obtaining module 902 is configured to obtain identification information related to an intelligent surface device, where the identification information is information obtained by detecting an echo signal of the first signal by the first communication device, or information that is obtained by detecting an echo signal of the first signal by a second communication device and then is forwarded to the first communication device.

In a possible implementation, the first signal includes one of the following:

a sensing signal for implementing a sensing function;

a communication signal for information transmission; and a communication-sensing integrated signal for implementing the sensing function and information transmission.

In a possible implementation, the first signal includes a control command, where the control command is used for controlling a reflection mode for the intelligent surface device to reflect the first signal.

In a possible implementation, the sending module 901 is further configured to:

send a first trigger signal, where the first trigger signal is used for triggering the intelligent surface device to use a specific reflection mode.

In a possible implementation, the sending module 901 is further configured to:

send first indication information to the intelligent surface device after the first communication device obtains the identification information, where the first indication information instructs the intelligent surface device to exit a specific reflection mode, and the specific reflection mode is a default reflection mode of the intelligent surface device.

In a possible implementation, the first signal includes identity indication information, where the identity indication information is used for indicating an identity of the first communication device.

In a possible implementation, the specific reflection mode includes:

a first reflection mode, where in the first reflection mode, the intelligent surface device reflects a received signal at an angle in a preset beam forwarding angle set; or a second reflection mode, where in the second reflection mode, the intelligent surface device reflects a received signal at an angle corresponding to a direction of arrival.

In a possible implementation, that the first communication device or the second communication device detects an echo signal of the first signal includes:

determining, by the first communication device or the second communication device according to a maximum detection distance and/or a first duration for sending a single first signal, a second duration for listening to the echo signal; and detecting the echo signal within the second duration.

In a possible implementation, if the intelligent surface device uses the first reflection mode, and one first signal corresponds to each angle in the beam forwarding angle set, the first duration for the sending module 901 to send the single first signal is at least greater than a total mode switching time required by the intelligent surface device for traversing angles in the beam forwarding angle set.

In a possible implementation, if the intelligent surface device uses the first reflection mode, and one first signal corresponds to one angle in the beam forwarding angle set, a quantity of first signals sent by the sending module 901 at a same angle and/or in a same beam direction is at least greater than a quantity of angles in the beam forwarding angle set.

In a possible implementation, a start moment of a latter first signal that is sent by the sending module 901 at the same angle and/or in the same beam direction is later than an end moment of echo listening of a former first signal.

In a possible implementation, that the obtaining module 902 obtains the identification information includes:

listening to the echo signal of the first signal after sending the first signal, and determining, according to strength of the listened echo signal, whether there is an intelligent surface device at a transmission angle and/or in a beam direction of the first signal.

In a possible implementation, that the obtaining module 902 obtains the identification information further includes:

detecting feature information of the echo signal, and identifying identity information of the intelligent surface device according to a detection result, where the feature information includes at least one of the following: an amplitude, a phase, polarization, and orbital angular momentum information.

In a possible implementation, that the obtaining module 902 obtains the identification information includes:

sending second indication information to the second communication device, where the second indication information includes at least one of the following: an indication of starting echo listening and a format of the first signal; and receiving the identification information sent by the second communication device, where the identification information is obtained by detecting and processing the echo signal of the first signal by the second communication device, and the identification information includes third indication information, the third indication information being used for indicating whether there is an intelligent surface device at a transmission angle and/or in a beam direction of the first signal.

The apparatus for identifying an intelligent surface device in the embodiments of this application may be an apparatus, or may be a component, an integrated circuit, or a chip in the terminal or the base station. The terminal may be a mobile terminal, or may be a non-mobile terminal. Exemplarily, the mobile terminal may include but is not limited to a type of the terminal 11 listed above, and the non-mobile terminal may be a server, a network attached storage (NAS), a personal computer (PC), a television (TV), a teller machine, a self-service machine, or the like. This is not specifically limited in the embodiments of this application. The base station may include but is not limited to the base station 12 listed above.

The apparatus for identifying an intelligent surface device in the embodiments of this application may be an apparatus having an operating system. The operating system may be an Android operating system, may be an ios operating system, or may be another possible operating system, and is not specifically limited in the embodiments of this application.

The apparatus for identifying an intelligent surface device provided in the embodiments of this application can implement the processes implemented by the first communication device in the method embodiment of FIG. 2 to FIG. 8 and achieve the same technical effect. To avoid repetition, details are not described herein again.

Figure 10:
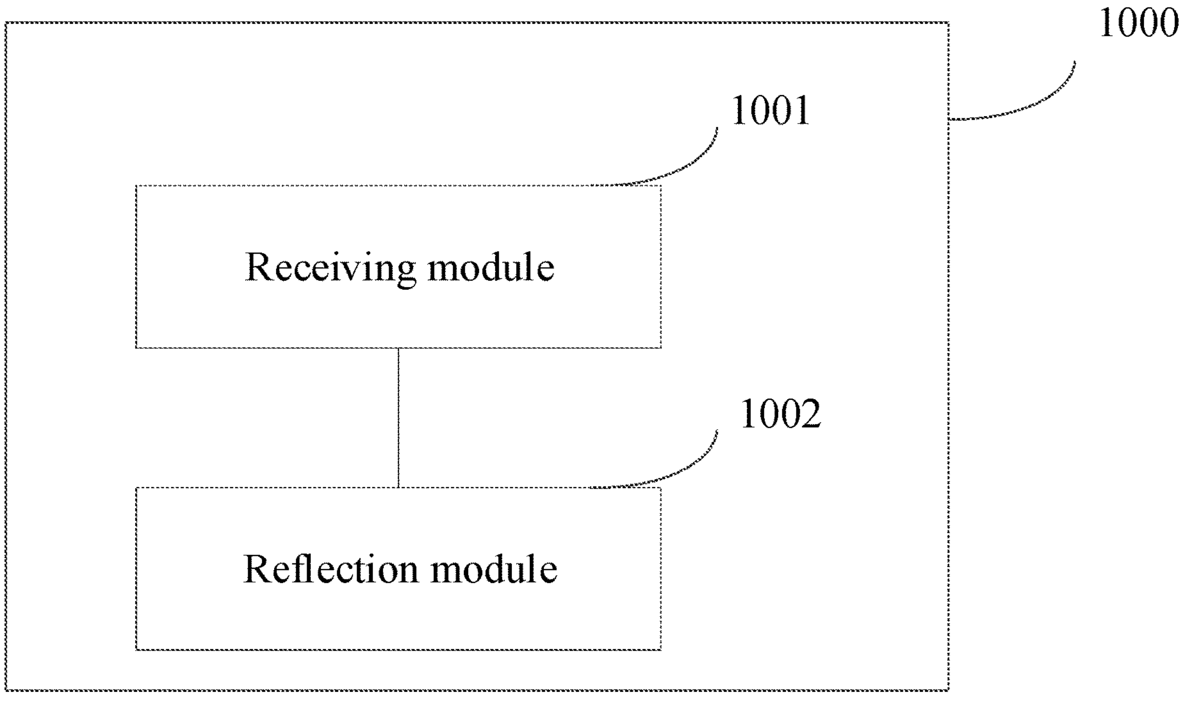
FIG. 10 is a schematic structural diagram of a signal reflection apparatus according to an embodiment of this application.

FIG. 10 is a schematic structural diagram of a signal reflection apparatus according to an embodiment of this application. The apparatus 1000 is used in an intelligent surface device. As shown in FIG. 10, the apparatus 1000 mainly includes a receiving module 1001 and a reflection module 1002.

In this embodiment of this application, the receiving module 1001 is configured to receive a first signal sent by a first communication device; and the reflection module 1002 is configured to reflect the first signal in a specific reflection mode, to send an echo signal of the first signal.

In a possible implementation, the first signal includes one of the following:

a sensing signal for implementing a sensing function;

a communication signal for information transmission; and a communication-sensing integrated signal for implementing the sensing function and information transmission.

In a possible implementation, the receiving module 1001 is further configured to:

receive, before the reflection module 1002 reflects the first signal in the specific reflection mode, a first trigger signal sent by the first communication device, and set a reflection mode of the intelligent surface device to the specific reflection mode.

In a possible implementation, the apparatus further includes:

a setting module, configured to set the reflection mode of the intelligent surface to the specific reflection mode when the intelligent surface device has no signal forwarding behavior, where the specific reflection mode is a default reflection mode of the intelligent surface device.

In a possible implementation, the receiving module 1001 is further configured to receive first indication information sent by the first communication device, where the first indication information instructs to exit the specific reflection mode; and the setting module is further configured to stop use of the specific reflection mode according to an indication of the first indication information.

In a possible implementation, that the reflection module 1002 reflects the first signal in a specific reflection mode includes:

reflecting, according to a control command included in the first signal, the first signal by using a reflection mode corresponding to the control command, where an angle at which the intelligent surface device reflects the first signal is at least one angle that is in a preset beam forwarding angle set and that is associated with the control command.

In a possible implementation, the apparatus further includes:

a determining module, configured to determine identity indication information included in the first signal before the first signal is reflected, and determine that an identity of the first communication device indicated by the identity indication information is valid.

In a possible implementation, the specific reflection mode includes:

a first reflection mode, where in the first reflection mode, the intelligent surface device reflects a received signal at an angle in a preset beam forwarding angle set; or a second reflection mode, where in the second reflection mode, the intelligent surface device reflects a received signal at an angle corresponding to a direction of arrival.

In a possible implementation, that the reflection module 1002 reflects the first signal in a specific reflection mode includes one of the following:

obtaining a direction of arrival of the first signal, and reflecting the first signal at an angle corresponding to the direction of arrival;

performing traversal reflection on one received first signal according to each angle in the beam forwarding angle set; and reflecting at least one received first signal at an angle in the beam forwarding angle set.

In a possible implementation, that the reflection module 1002 reflects the first signal in a specific reflection mode includes:

performing, according to a first rule, reflection by changing feature information of the first signal, where the feature information includes at least one of the following: an amplitude, a phase, polarization, and orbital angular momentum information.

The signal reflection apparatus provided in the embodiments of this application can implement the processes implemented by the intelligent surface device in the method embodiment of FIG. 2 to FIG. 8 and achieve the same technical effect. To avoid repetition, details are not described herein again.

Figure 11:
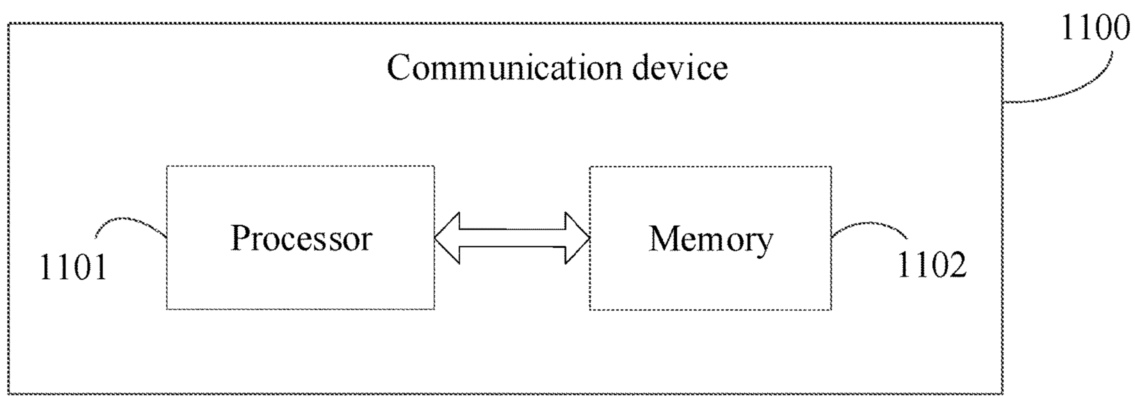
FIG. 11 is a schematic structural diagram of a communication device according to an embodiment of this application.

Optionally, as shown in FIG. 11, an embodiment of this application further provides a communication device 1100, including a processor 1101, a memory 1102, and a program or instructions stored in the memory 1102 and runnable on the processor 1101. For example, in a case that the communication device 1100 is a first communication device, the program or instruction is executed by the processor 1101 to implement the processes of the embodiments of the method for identifying an intelligent surface device, and achieve the same technical effects. In a case that the communication device 1100 is an intelligent surface device, the program or instruction is executed by the processor 1101 to implement the processes of the embodiments of the signal reflection method, and achieve the same technical effects. To avoid repetition, details are not described herein again.

Figure 12:
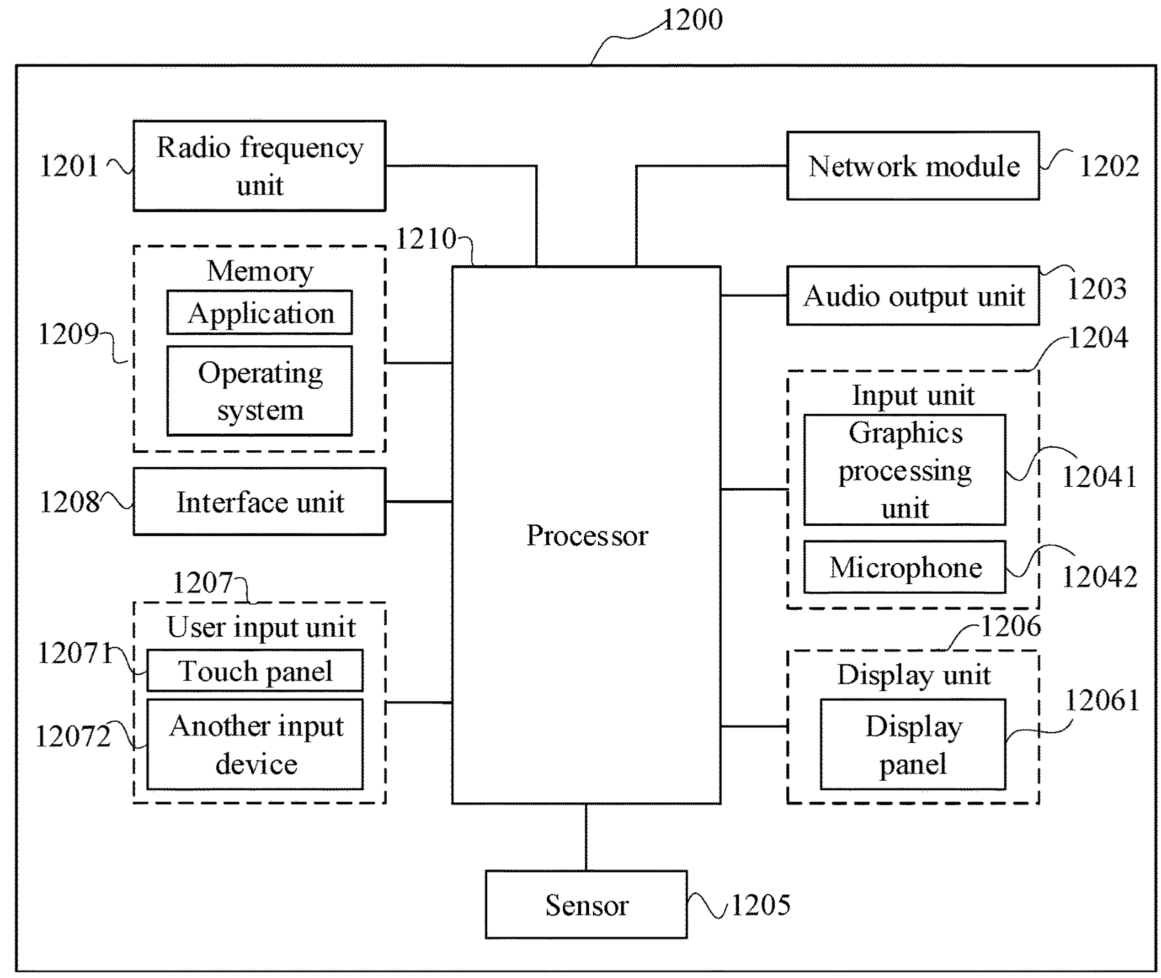
FIG. 12 is a schematic structural diagram of hardware of a terminal according to an embodiment of this application.

An embodiment of this application further provides a terminal, including a processor and a communication interface. The processor is configured to implement the processes of the embodiments of the method for identifying an intelligent surface device, and the communication interface is configured to communicate with an external communication device. An embodiment of the terminal corresponds to a method embodiment on a side of the first communication device. Each implementation process of the method embodiment is applicable to the embodiment of the terminal, and the same technical effects can be achieved. Specifically, FIG. 12 is a schematic diagram of a hardware structure of a terminal according to an embodiment of this application.

The terminal 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that, the terminal 1200 may further include a power supply (such as a battery) for supplying power to the components. Preferably, the power supply may be logically connected to the processor 1210 by using a power management system, thereby implementing functions such as charging, discharging, and power consumption management by using the power management system. A terminal structure shown in FIG. 12 does not constitute a limitation to the terminal, and the terminal may include more or fewer components than those shown in the figure, or some components may be combined, or a different component deployment may be used. Details are not described herein again.

It may be understood that, in the embodiments of this application, the input unit 1204 may include a graphics processing unit (GPU) 12041 and a microphone 12042. The graphics processing unit 12041 processes image data of a static picture or a video obtained by an image capturing apparatus (for example, a camera) in a video capturing mode or an image capturing mode. The display unit 1206 may include a display panel 12061, for example, a display panel 12061 configured in a form such as a liquid crystal display or an organic light-emitting diode. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include, but is not limited to, a physical keyboard, a functional key (such as a volume control key or a switch key), a track ball, a mouse, and a joystick, and the details will not be described herein again.

In this embodiment of this application, the radio frequency unit 1201 receives downlink data from a network side device and sends the data to the processor 1210 for processing; and sends uplink data to the network side device. Generally, the radio frequency unit 1201 includes, but is not limited to, an antenna, at least one amplifier, a transceiver, a coupler, a low noise amplifier, a duplexer, and the like.

The memory 1209 may be configured to store a software program or instructions and various data. The memory 1209 may mainly include a program storage or instruction area and a data storage area. The program storage or instruction area may store an operating system, an application program or instructions required by at least one function (for example, a sound playback function and an image playback function), or the like. In addition, the memory 1209 may include a high speed RAM, and may further include a non-transitory memory. The non-transitory memory may be a read-only memory (ROM), a programmable ROM (PROM), an erasable programmable read-only memory (EPROM), an electrically EPROM (EEPROM), or a flash memory. For example, at least one magnetic disk storage device, a flash memory device, or another non-transitory solid-state storage device.

The processor 1210 may include one or more processing units. Optionally, the processor 1210 may integrate an application processor and a modem processor. The application processor mainly processes an operating system, a user interface, an application program or instructions, and the like. The modem processor mainly processes wireless communication, for example, a baseband processor. It may be understood that the foregoing modem processor may not be integrated into the processor 1210.

The radio frequency unit 1201 is configured to send a first signal.

The processor 1210 is configured to obtain identification information related to an intelligent surface device, where the identification information is information obtained by detecting an echo signal of the first signal by the terminal, or information that is obtained by detecting an echo signal of the first signal by a second communication device and then is forwarded to the terminal.

In the embodiments of this application, the terminal sends a first signal, the intelligent surface device receives the first signal and reflects an echo signal of the first signal, and identification information related to the intelligent surface device may be obtained by detecting the echo signal by the terminal or the second communication device, to identify an intelligent surface device in a case that the intelligent surface device is unknown.

Optionally, the radio frequency unit 1201 is further configured to send a first trigger signal, where the first trigger signal is used for triggering the intelligent surface device to use a specific reflection mode.

Optionally, the radio frequency unit 1201 is further configured to send first indication information to the intelligent surface device after the first communication device obtains the identification information, where the first indication information instructs the intelligent surface device to exit a specific reflection mode, and the specific reflection mode is a default reflection mode of the intelligent surface device.

Optionally, the processor 1210 is further configured to determine, according to a maximum detection distance and/or a first duration for sending a single first signal, a second duration for listening to the echo signal; and detect the echo signal within the second duration.

Optionally, the processor 1210 is further configured to: listen to the echo signal of the first signal after sending the first signal, and determine, according to strength of the listened echo signal, whether there is an intelligent surface device at a transmission angle and/or in a beam direction of the first signal.

Optionally, the processor 1210 is further configured to: detect feature information of the echo signal, and identify identity information of the intelligent surface device according to a detection result, where the feature information includes at least one of the following: an amplitude, a phase, polarization, and orbital angular momentum information.

Optionally, the radio frequency unit 1201 is further configured to:

- send second indication information to the second communication device, where the second indication information includes at least one of the following: an indication of starting echo listening and a format of the first signal; and
- receive the identification information sent by the second communication device, where the identification information is obtained by detecting and processing the echo signal of the first signal by the second communication device, and the identification information includes third indication information, the third indication information being used for indicating whether there is an intelligent surface device at a transmission angle and/or in a beam direction of the first signal.

An embodiment of this application further provides a network side device, including a processor and a communication interface. The processor is configured to implement the embodiments of the method for identifying an intelligent surface device, and the communication interface is configured to communicate with an external communication device. An embodiment of the network side device corresponds to a method embodiment on a side of the first communication device. Each implementation process of the method embodiment is applicable to the embodiment of the network side device, and the same technical effects can be achieved.

Figure 13:
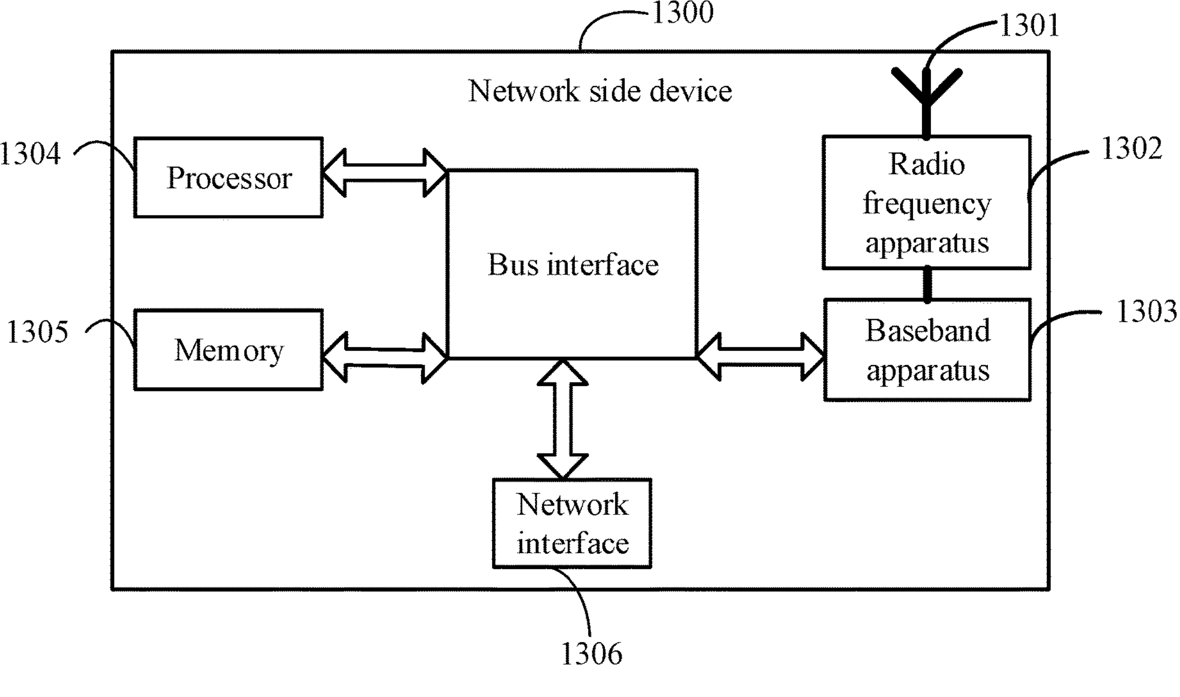
FIG. 13 is a schematic structural diagram of hardware of a network side device according to an embodiment of this application.

Specifically, an embodiment of this application further provides a network side device. As shown in FIG. 13, the network device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the received information to the baseband apparatus 1303 for processing. In a downlink direction, the baseband apparatus 1303 processes to-be-processed information, and sends the information to the radio frequency apparatus 1302. The radio frequency apparatus 1302 processes received information and sends the information by using the antenna 1301.

The frequency band processing apparatus may be located in the baseband apparatus 1303, and the method performed by the network side device in the foregoing embodiments may be implemented in the baseband apparatus 1303. The baseband apparatus 1303 includes a processor 1304 and a memory 1305.

The baseband apparatus 1303 may include, for example, at least one baseband plate. A plurality of chips are arranged on the baseband plate. As shown in FIG. 13, one of the plurality of chips is, for example, the processor 1304, and is connected to the memory 1305, to invoke a program in the memory 1305 to perform operations performed by the network side device in the foregoing method embodiment.

The baseband apparatus 1303 may further include a network interface 1306, configured to exchange information with the radio frequency apparatus 1302. The interface is, for example, a common public radio interface (CPRI).

Specifically, the network side device in this embodiment of the present invention further includes: instructions or a program stored in the memory 1305 and executable on the processor 1304, and the processor 1304 invokes the instructions or program in the memory 1305 to perform the method performed by the modules shown in FIG. 9, and can achieve the same technical effect. To avoid repetition, details are not described herein again.

An embodiment of this application further provides a readable storage medium, storing a program or instructions, the program or instructions, when executed by a processor, implementing the processes of the embodiments of the method for identifying an intelligent surface device or processes of the embodiments of the signal reflection method, and achieving the same technical effect. To avoid repetition, details are not described herein again.

The processor is a processor in the communication device in the foregoing embodiments. The readable storage medium includes a computer-readable storage medium, for example, a read-only memory (ROM), a random access memory (RAM), a magnetic disk, an optical disk, or the like.

An embodiment of this application further provides a chip, including a processor and a communication interface coupled to each other, the processor being configured to run a program or instructions to implement the processes of the embodiments of the method for identifying an intelligent surface device or the processes of the embodiments of the signal reflection method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program/program product. The computer program/program product is stored in a non-transitory storage medium, and the computer program/program product is executed by at least one processor to implement the processes of the embodiments of the method for identifying an intelligent surface device or implement the processes of the embodiments of the signal reflection method, and can achieve the same technical effects. To avoid repetition, details are not described herein again.

It is to be noted that, the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the implementations of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the related art may be implemented in the form of a computer software product. The computer software product is stored in a storage medium (such as a ROM/RAM, a magnetic disk, or an optical disc), and includes several instructions for instructing a communication device (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

What is claimed is:

1. A method for identifying an intelligent surface device, comprising:

sending, by a first communication device, a first signal; and obtaining, by the first communication device, identification information related to the intelligent surface device, wherein the identification information is information obtained by detecting an echo signal of the first signal by the first communication device, or information that is obtained by detecting an echo signal of the first signal by a second communication device and then is forwarded to the first communication device;

wherein the method further comprises:

sending, by the first communication device, a first trigger signal, wherein the first trigger signal is used for triggering the intelligent surface device to use a specific reflection mode, the specific reflection mode being selected from a group comprising a first reflection mode and a second reflection mode, wherein:

in the first reflection mode, the intelligent surface device reflects a received signal at an angle in a preset beam forwarding angle set; and in the second reflection mode, the intelligent surface device reflects a received signal at an angle corresponding to a direction of arrival.

2. The method according to claim 1, wherein the first signal comprises a control command, wherein the control command is used for controlling a reflection mode for the intelligent surface device to reflect the first signal;

wherein the control command is associated with at least one angle in a beam forwarding angle set preset by the intelligent surface device.

3. The method according to claim 1, wherein after the obtaining, by the first communication device, identification information, the method further comprises:

sending, by the first communication device, first indication information to the intelligent surface device, wherein the first indication information instructs the intelligent surface device to exit the specific reflection mode.

4. The method according to claim 1, wherein if the intelligent surface device uses the first reflection mode, and one first signal corresponds to each angle in the beam forwarding angle set, a first duration for the first communication device to send a single first signal is at least greater than a total mode switching time required by the intelligent surface device for traversing angles in the beam forwarding angle set; or, wherein if the intelligent surface device uses the first reflection mode, and one first signal corresponds to one angle in the beam forwarding angle set, a quantity of first signals sent by the first communication device at a same angle and/or in a same beam direction is at least greater than a quantity of angles in the beam forwarding angle set;

wherein a start moment of a latter first signal that is sent by the first communication device at the same angle and/or in the same beam direction is later than an end moment of echo listening of a former first signal.

5. The method according to claim 1, wherein the first signal comprises identity indication information, wherein the identity indication information is used for indicating an identity of the first communication device.

6. The method according to claim 1, wherein the detecting, by the first communication device or the second communication device, an echo signal of the first signal comprises:

determining, by the first communication device or the second communication device according to a maximum detection distance and/or a first duration for sending a single first signal, a second duration for listening to the echo signal; and detecting the echo signal within the second duration.

7. The method according to claim 1, wherein the obtaining, by the first communication device, identification information comprises:

listening, by the first communication device, to the echo signal of the first signal after sending the first signal, and determining, according to strength of the listened echo signal, whether there is an intelligent surface device at a transmission angle and/or in a beam direction of the first signal.

8. The method according to claim 7, wherein the obtaining, by the first communication device, identification information further comprises:

detecting, by the first communication device, feature information of the echo signal, and identifying identity information of the intelligent surface device according to a detection result, wherein the feature information comprises at least one of the following: an amplitude, a phase, polarization, and orbital angular momentum information.

9. The method according to claim 1, wherein the obtaining, by the first communication device, identification information comprises:

sending, by the first communication device, second indication information to the second communication device, wherein the second indication information comprises at least one of the following: an indication of starting echo listening and a format of the first signal; and receiving, by the first communication device, the identification information sent by the second communication device, wherein the identification information is obtained by detecting and analyzing the echo signal of the first signal by the second communication device, and the identification information comprises third indication information, the third indication information being used for indicating whether there is an intelligent surface device at a transmission angle and/or in a beam direction of the first signal.

10. The method according to claim 9, wherein the identification information further comprises identity information of the intelligent surface device; or, wherein the format of the first signal comprises at least one of the following: a waveform, sequence information, a sending angle, and a beam direction of the first signal;

wherein the identification information further comprises a target sending angle and/or a target beam direction, wherein the target sending angle and/or the target beam direction are/is a sending angle and/or a beam direction of the first signal corresponding to the echo signal.

11. A signal reflection method, comprising:

receiving, by an intelligent surface device, a first signal sent by a first communication device; and reflecting, by the intelligent surface device, the first signal in a specific reflection mode, to send an echo signal of the first signal;

wherein the specific reflection mode is selected from a group comprising a first reflection mode and a second reflection mode, wherein:

in the first reflection mode, the intelligent surface device reflects a received signal at an angle in a preset beam forwarding angle set; and in the second reflection mode, the intelligent surface device reflects a received signal at an angle corresponding to a direction of arrival.

12. The method according to claim 11, wherein before the reflecting, by the intelligent surface device, the first signal in the specific reflection mode, the method further comprises:

receiving, by the intelligent surface device, a first trigger signal sent by the first communication device, and setting a reflection mode of the intelligent surface device to the specific reflection mode; or, wherein before the reflecting, by the intelligent surface device, the first signal in the specific reflection mode, the method further comprises:

entering, by the intelligent surface device, the specific reflection mode when there is no signal forwarding behavior; or, wherein after the reflecting, by the intelligent surface device, the first signal in the specific reflection mode, the method further comprises:

receiving first indication information sent by the first communication device, wherein the first indication information instructs the intelligent surface device to exit the specific reflection mode; and stopping use of the specific reflection mode according to an indication of the first indication information; or, wherein before the reflecting, by the intelligent surface device, the first signal in the specific reflection mode, the method further comprises:

determining identity indication information comprised in the first signal, and determining that an identity of the first communication device indicated by the identity indication information is valid.

13. The method according to claim 11, wherein the reflecting, by the intelligent surface device, the first signal in the specific reflection mode comprises:

reflecting, by the intelligent surface device according to a control command comprised in the first signal, the first signal by using a reflection mode corresponding to the control command, wherein an angle at which the intelligent surface device reflects the first signal is at least one angle that is in a preset beam forwarding angle set and that is associated with the control command.

14. The method according to claim 11, wherein the reflecting, by the intelligent surface device, the first signal in the specific reflection mode comprises one of the following:

obtaining, by the intelligent surface device, a direction of arrival of the first signal, and reflecting the first signal at an angle corresponding to the direction of arrival;

performing, by the intelligent surface device, traversal reflection on one received first signal according to each angle in the beam forwarding angle set; and reflecting, by the intelligent surface device, at least one received first signal at an angle in the beam forwarding angle set.

15. The method according to claim 11, wherein the reflecting, by the intelligent surface device, the first signal in the specific reflection mode comprises:

performing, by the intelligent surface device according to a first rule, reflection by changing feature information of the first signal, wherein the feature information comprises at least one of the following: an amplitude, a phase, polarization, and orbital angular momentum information.

16. An intelligent surface device, comprising a processor, a memory, and a program or instructions stored in the memory and executable on the processor, the program or instructions, when executed by the processor, implementing the steps of the signal reflection method according to claim 11.

17. A communication device, comprising a processor, a memory, and a program or instructions stored in the memory and executable on the processor, wherein when the program or instructions are executed by the processor, the processor is configured to implement the following steps:

sending a first signal; and obtaining identification information related to an intelligent surface device, wherein the identification information is information obtained by detecting an echo signal of the first signal by a first communication device, or information that is obtained by detecting an echo signal of the first signal by a second communication device and then is forwarded to the first communication device;

wherein the steps further comprise:

sending a first trigger signal, wherein the first trigger signal is used for triggering the intelligent surface device to use a specific reflection mode, the specific reflection mode being selected from a group comprising a first reflection mode and a second reflection mode, wherein:

in the first reflection mode, the intelligent surface device reflects a received signal at an angle in a preset beam forwarding angle set; and in the second reflection mode, the intelligent surface device reflects a received signal at an angle corresponding to a direction of arrival.

* * * * *